US012610146B2

(12) United States Patent
Karube

(10) Patent No.: US 12,610,146 B2
(45) Date of Patent: Apr. 21, 2026

(54) CAMERA ANGLE DECIDING DEVICE, CAMERA ANGLE DECIDING METHOD AND PROGRAM, IMAGING SYSTEM, AND DAMAGE DETERMINATION SYSTEM

(71) Applicant: FUJIFILM Corporation, Tokyo (JP)

(72) Inventor: Mikihiko Karube, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 218 days.

(21) Appl. No.: 18/524,133

(22) Filed: Nov. 30, 2023

(65) Prior Publication Data

US 2024/0098371 A1 Mar. 21, 2024

Related U.S. Application Data

(63) Continuation of application No. PCT/JP2022/019693, filed on May 9, 2022.

(30) Foreign Application Priority Data

Jun. 10, 2021 (JP) ................................ 2021-097455

(51) Int. Cl.
*H04N 23/69* (2023.01)
*H04N 23/60* (2023.01)

(52) U.S. Cl.
CPC ............. *H04N 23/69* (2023.01); *H04N 23/64* (2023.01)

(58) Field of Classification Search
CPC ....... H04N 23/69; H04N 23/64; H04N 23/695
See application file for complete search history.

(56) References Cited

U.S. PATENT DOCUMENTS

2019/0007585 A1 1/2019 Okahara et al.
2019/0317530 A1* 10/2019 Yang ........................ G08G 5/74
(Continued)

FOREIGN PATENT DOCUMENTS

CN 112254713 B 3/2021
EP 1081645 A1 3/2001
(Continued)

OTHER PUBLICATIONS

International Search Report issued in PCT/JP2022/019693; mailed Aug. 2, 2022.
(Continued)

*Primary Examiner* — Yogesh K Aggarwal
(74) *Attorney, Agent, or Firm* — Studebaker Brackett PLLC

(57) ABSTRACT

Provided are a camera angle deciding device, a camera angle deciding method and program, an imaging system, and a damage determination system that decide an appropriate imaging angle of a camera for imaging wall surfaces of densely located buildings. A camera angle deciding device that decides a depression angle formed by an optical axis of a camera, which images a plurality of buildings on a ground from a sky and converts the imaged buildings into image data, with respect to a horizontal direction includes at least one processor and at least one memory that stores a command for execution by the processor. The at least one processor solves the above problem with the camera angle deciding device that decides the depression angle based on a height of the camera from the ground and a degree of density of the plurality of buildings.

9 Claims, 7 Drawing Sheets

(56) References Cited

U.S. PATENT DOCUMENTS

2020/0150649 A1* 5/2020 Barua .................. G05D 1/0038
2021/0297877 A1* 9/2021 Che ......................... H02J 50/20

FOREIGN PATENT DOCUMENTS

| | | | |
|---|---|---|---|
| JP | 2000-276045 | A | 10/2000 |
| JP | 2016-118995 | A | 6/2016 |
| JP | 2018-010630 | A | 1/2018 |
| JP | 2020-043543 | A | 3/2020 |
| WO | 2017/134987 | A1 | 8/2017 |

OTHER PUBLICATIONS

International Preliminary Report on Patentability (Chapter I) and Written Opinion of the International Searching Authority issued in PCT/JP2022/019693; issued Nov. 21, 2023.
"Notice of Reasons for Refusal" Office Action issued in JP 2023-527573; mailed by the Japanese Patent Office on Dec. 19, 2025.

* cited by examiner

FIG. 1

CAMERA ANGLE DECIDING DEVICE, CAMERA ANGLE DECIDING METHOD AND PROGRAM, IMAGING SYSTEM, AND DAMAGE DETERMINATION SYSTEM

CROSS-REFERENCE TO RELATED APPLICATIONS

The present application is a Continuation of PCT International Application No. PCT/JP2022/019693 filed on May 9, 2022 claiming priority under 35 U.S.C. § 119(a) to Japanese Patent Application No. 2021-097455 filed on Jun. 10, 2021. Each of the above applications is hereby expressly incorporated by reference, in its entirety, into the present application.

BACKGROUND OF THE INVENTION

1. Field of the Invention

The present invention relates to a camera angle deciding device, a camera angle deciding method and program, an imaging system, and a damage determination system that image a plurality of buildings on a ground from a sky, and particularly relates to a technique of deciding an imaging angle of a camera.

2. Description of the Related Art

In a case where disasters such as an earthquake and a flood occur, a local government needs to quickly check a collapse situation of a building and a flooding situation. In this case, a picture of the entire city area is imaged by a camera provided in a drone or a tall building.

JP2018-10630A discloses a subject abnormality presence/absence investigation system that detects, from a captured image captured by a camera mounted on an autonomous flying object that flies, a change portion in which a change is made, such as fracture, breakage, fissuring, or deterioration of an outer wall, roof, and the like of a building, or inclination or displacement of the building, to investigate the presence or absence of an abnormality including a degree of severity of the building.

SUMMARY OF THE INVENTION

In the subject abnormality presence/absence investigation system disclosed in JP2018-10630A, a case where buildings are densely located is not taken into consideration. Thus, there is a problem that it is not possible to sufficiently image a wall surface, which is important in a building structure, in a case where the buildings are densely located.

The present invention has been made in view of such circumstances, and a purpose there is to provide a camera angle deciding device, a camera angle deciding method and program, an imaging system, and a damage determination system that decide an appropriate imaging angle of a camera for imaging wall surfaces of densely located buildings.

A camera angle deciding device according to an aspect of the present invention is a camera angle deciding device that decides a depression angle formed by an optical axis of a camera, which images a plurality of buildings on a ground from a sky and converts the imaged buildings into image data, with respect to a horizontal direction, the camera angle deciding device including at least one processor and at least one memory that stores a command for execution by the processor, in which the at least one processor is configured to decide the depression angle based on a height of the camera from the ground and a degree of density of the plurality of buildings.

It is preferable that the at least one processor is configured to calculate the degree of density based on heights of the plurality of buildings and spacings between the plurality of buildings.

In a case where a height of the camera from the ground is h, the depression angle is $\theta$, a half angle of view of the camera is $\alpha$, a distance of an imaging target point from the camera in the horizontal direction is r, a farthest imaging distance of the camera based on a resolution of the camera is x, an average of the heights of the plurality of buildings is d, and an average of the spacings between the plurality of buildings is s, it is preferable that the at least one processor is configured to calculate an imaging efficiency $e_1(\theta)$ in the horizontal direction based on a first function $E_1(\theta)$ represented by r that satisfies $h/\tan(\theta+\alpha) \leq r \leq h/\tan(\theta-\alpha)$ and $0 \leq r \leq x$, and calculate an imaging efficiency $e_2(\theta)$ of wall surfaces of the plurality of buildings based on a second function $E_2(\theta)$ represented by $E_2(\theta)=s\cdot\tan(\theta+\alpha)$ to decide the depression angle $\theta$ based on the imaging efficiency $e_1(\theta)$ in the horizontal direction and the imaging efficiency $e_2(\theta)$ of the wall surface with $E_2(\theta)=d$ in a case where a value of $E_2(\theta)$ exceeds d.

It is preferable that the at least one processor is configured to standardize the first function $E_1(\theta)$ to calculate the imaging efficiency $e_1(\theta)$ in the horizontal direction, and standardize the second function $E_2(\theta)$ to calculate the imaging efficiency $e_2(\theta)$ of the wall surface.

It is preferable that the at least one processor is configured to weight the imaging efficiency $e_1(\theta)$ in the horizontal direction and the imaging efficiency $e_2(\theta)$ of the wall surface to decide the depression angle $\theta$.

An imaging system according to an aspect of the present invention is an imaging system including a flying object, the camera mounted on the flying object, a support device that supports the camera such that the depression angle of the camera is configured to be changed, and the camera angle deciding device described above.

It is preferable that the at least one processor is configured to acquire information on an area imaged by the camera and acquire the depression angle of the acquired area from depression angle information stored in advance for each area, and the support device sets the camera at the acquired depression angle.

A damage determination system according to an aspect of the present invention is a damage determination system including a trained model that determines damage to the plurality of buildings based on an image captured by the imaging system described above, and an output device that outputs a result of the determination.

A camera angle deciding method according to an aspect of the present invention is a camera angle deciding method of deciding a depression angle formed by an optical axis of a camera, which images a plurality of buildings on a ground from a sky and converts the imaged buildings into image data, with respect to a horizontal direction, the camera angle deciding method including deciding the depression angle based on a height of the camera from the ground and a degree of density of the plurality of buildings.

A program according to an aspect of the present invention is a program causing a computer to execute the camera angle deciding method described above. A computer-readable non-transitory storage medium on which the program is recorded may also be included in the present aspect.

According to the present invention, it is possible to decide the appropriate imaging angle of the camera for imaging the wall surfaces of the densely located buildings.

BRIEF DESCRIPTION OF THE DRAWINGS

FIG. 1 is a schematic diagram of a damage determination system according to the present embodiment.

DESCRIPTION OF THE PREFERRED EMBODIMENTS

Figure 2:
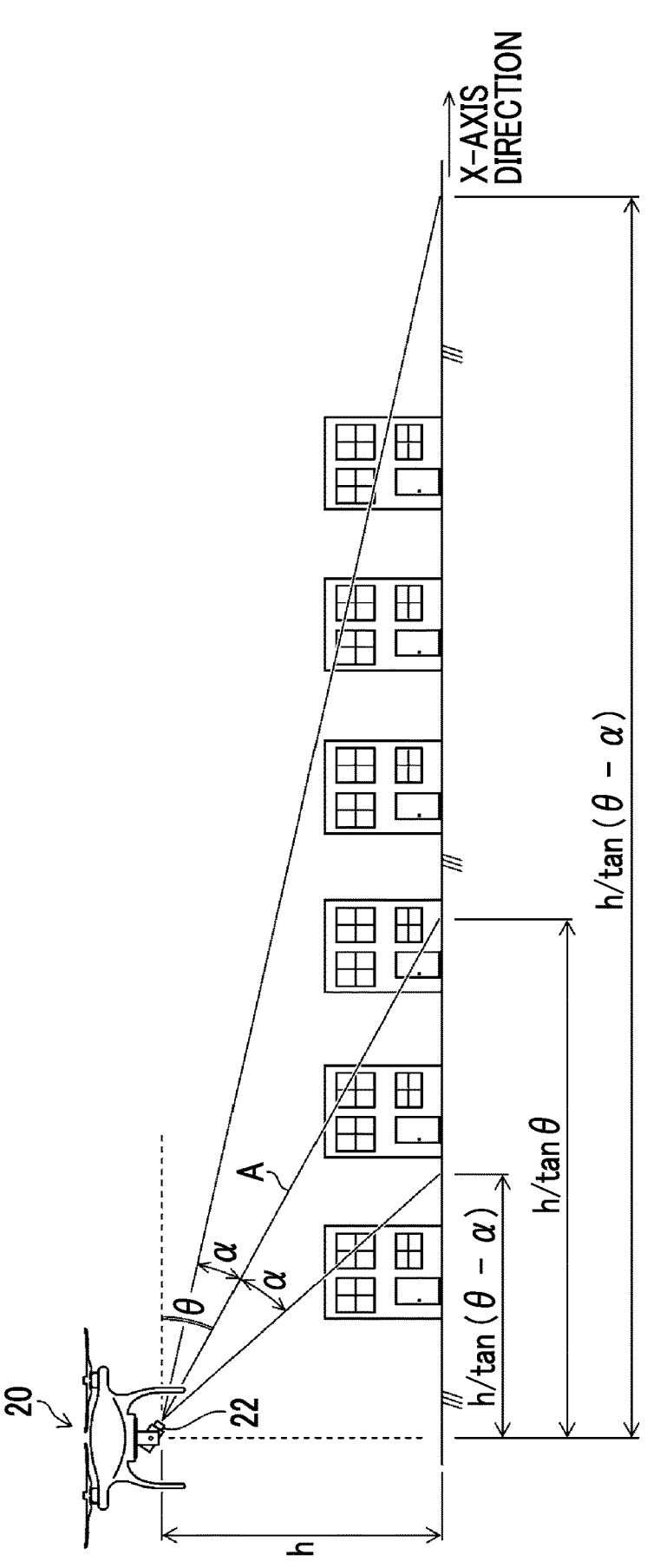
FIG. 2 is a diagram for describing a depression angle and an imaging range of a camera.

Hereinafter, preferred embodiments of the present invention will be described with reference to the accompanying drawings.

[Overall Configuration of Damage Determination System]

Figure 1:
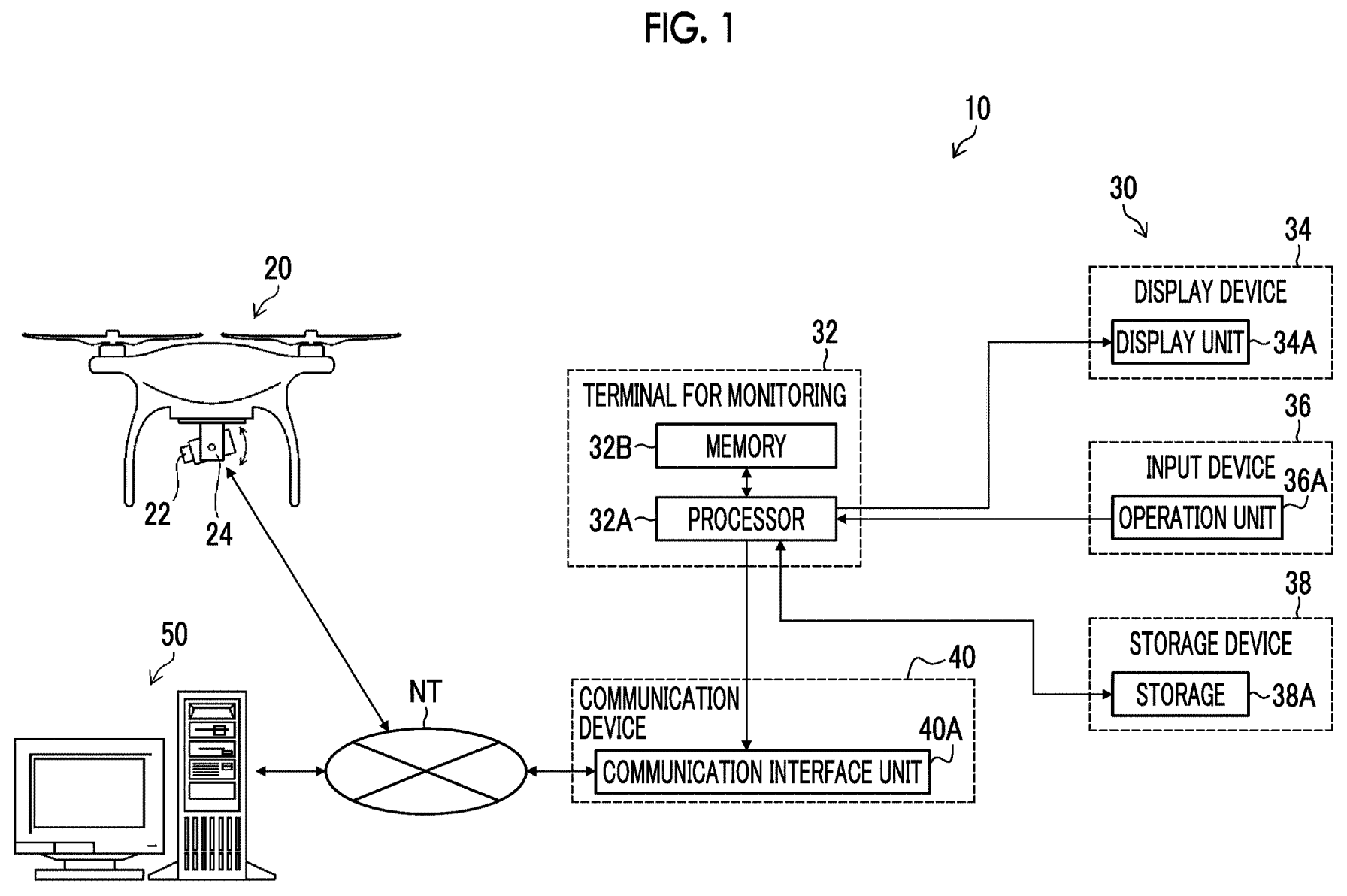

FIG. 1 is a schematic diagram of a damage determination system 10 according to the present embodiment. As shown in FIG. 1, the damage determination system 10 includes a drone 20, a camera angle deciding system 30, and a management server 50. The drone 20 and the camera angle deciding system 30 constitute an imaging system.

The drone 20 is an unmanned aerial vehicle (UAV, an example of flying object) that is remotely operated by a controller (not shown). The drone 20 may have an auto-pilot function of flying according to a predetermined program. The drone 20 can acquire latitude, longitude, and altitude of a flight position of the drone 20 by a global positioning system (GPS) detector (not shown) mounted on the drone 20. The drone 20 may acquire flight altitude by an altitude meter (not shown) mounted on the drone 20. In addition, the drone 20 can acquire a flight speed of the drone 20 by a speed sensor (not shown) mounted on the drone 20.

The drone 20 is mounted with a camera 22. The camera 22 is an imaging apparatus comprising a lens (not shown) and an imaging element (not shown). The lens of the camera 22 forms an image of received subject light on an imaging plane of the imaging element. The imaging element of the camera 22 receives the image of the subject light formed on the imaging plane and outputs an image signal of a subject. The camera 22 is supported by the drone 20 via a gimbal 24 (an example of support device). The gimbal 24 supports camera 22 such that a camera angle in at least a tilt direction of the camera 22 can be changed to a desired angle by a motor (not shown).

The drone 20 images the ground from the sky with the camera 22, for example, in a case where a large-scale disaster occurs. The camera 22 images, from the sky, a plurality of buildings on the ground and converts the imaged buildings into image data to acquire an aerial image (high-altitude image) including the buildings. The building refers to a dwelling house, such as a "detached house" and an "apartment house", but may include a whole architectural structure, such as a "store", an "office", and a "factory". The building includes a wall surface. The wall surface is a surface of a wall at a boundary between the inside of the building and the outside of the building.

The camera angle deciding system 30 is a camera angle deciding device that decides the camera angle of the camera 22 in the tilt direction. The camera angle deciding system 30 includes a terminal for monitoring 32, a display device 34, an input device 36, a storage device 38, and a communication device 40.

The terminal for monitoring 32 includes a processor 32A and a memory 32B. The processor 32A executes a command stored in the memory 32B. A hardware structure of the processor 32A is various processors as shown below. Various processors include a central processing unit (CPU) as a general-purpose processor that acts as various function units by executing software (program), a graphics processing unit (GPU) as a processor specialized in image processing, a programmable logic device (PLD) as a processor of which a circuit configuration can be changed after manufacture, such as a field programmable gate array (FPGA), a dedicated electric circuit as a processor which has a circuit configuration specifically designed to execute specific processing, such as an application specific integrated circuit (ASIC), and the like.

One processing unit may be configured by using one of these various processors, or may be configured by using two or more processors of the same type or different types (for example, a plurality of FPGAs, or a combination of a CPU and an FPGA, or a combination of a CPU and a GPU). In addition, a plurality of function units may be configured by using one processor. As an example of configuring the plurality of function units with one processor, first, as represented by a computer such as a client or a server, a form of configuring one processor with a combination of one or more CPUs and software and causing the processor to act as the plurality of function units is present. A second example of the configuration is an aspect in which a processor that realizes functions of an entire system including the plurality of function units with one integrated circuit (IC) chip is used, as typified by a system-on-chip (SoC). As described above, various function units are composed of using one or more of the various processors described above as a hardware structure.

Further, the hardware structure of these various processors is, more specifically, an electric circuit (circuitry) combining circuit elements such as a semiconductor element. The memory 32B stores a command to be executed by the processor 32A. The memory 32B includes a random access memory (RAM) and a read only memory (ROM) (not shown). The processor 32A executes software by using various programs and parameters stored in the ROM with the RAM as a work region and uses the parameters stored in the ROM and the like to execute various types of processing of the camera angle deciding system 30.

The display device 34 comprises a display unit 34A such as a liquid crystal display. The display device 34 causes the display unit 34A to display information required by a user in accordance with an instruction of the terminal for monitoring 32.

The input device 36 comprises an operation unit 36A including a pointing device, a keyboard, and the like. The input device 36 is for the user to input various types of information and a desired designation to the damage determination system 10.

The storage device 38 comprises a storage 38A such as a magnetic disk and a semiconductor memory. The storage device 38 causes the storage 38A to store a plurality of pieces of image data, sensor data, an analysis result, disaster information, and the like. The storage device 38 may comprise a storage medium that can be attached to and detached from the terminal for monitoring 32, such as a digital versatile disc (DVD) or a compact disc-read only memory (CD-ROM).

The communication device 40 comprises a communication interface unit 40A. The communication device 40 is connected to a communication network such as the Internet and a local area network (LAN) via the communication interface unit 40A to be able to transmit and receive data.

The communication interface unit 40A receives information about the drone 20 and transmits the camera angle in the terminal for monitoring 32, and acquires data such as information about a degree of density, which will be described later, of an imaging target area from the management server 50.

The management server 50 is realized by at least one computer. The management server 50 is connected to the drone 20 and the terminal for monitoring 32 via a network NT to be able to transmit and receive data.

The management server 50 comprises a trained model that determines, based on the image of the plurality of buildings on the ground, which is imaged from the sky, damage to the plurality of buildings in the image. In the trained model, the learning is performed by using, as learning data, the image of the plurality of buildings on the ground, which is imaged from the sky, and a correct-answer label related to the damage to the buildings in the image. In a case where the image of the plurality of buildings on the ground, which is imaged from the sky, is input, the trained model outputs a label related to the damage to the buildings in the image. The damage to the building includes collapse of building, failure in wall surface and roof, burning down due to fire, outflow and flooding due to tsunami, sedimentation and tilt due to liquefaction of subsoil, and the like.

[Imaging Range of Camera]

In the present embodiment, the camera 22 is directed in a traveling direction of the drone 20 in a pan direction and is directed in a set camera angle in the tilt direction to image the wall surface of the building facing the traveling direction of the drone 20. Here, the camera angle refers to a depression angle of the camera 22. The depression angle refers to an angle of inclination of an optical axis A of the camera 22 downward from a horizontal direction. A case where the camera 22 is directed in the traveling direction of the drone 20 horizontally is set to 0 degrees, and a case where the camera 22 is directed in the traveling direction of the drone 20 vertically downward is set to 90 degrees.

FIG. 2 is a diagram for describing the depression angle and the imaging range of the camera 22. In the example shown in FIG. 2, the traveling direction of the drone 20 is an X-axis direction, and the camera 22 is disposed at a height h [unit: meter] from the ground.

As shown in FIG. 2, the optical axis A of the camera 22 is directed downward in a vertical direction by a depression angle θ [unit: degree] with respect to the horizontal direction. A half angle of view α [unit: degree] of the camera 22 is an angle formed by the optical axis A of the camera 22 and an outermost ray that can be imaged by the camera 22, and is a predetermined value. The imaging range of the camera

22 in the vertical direction has a center at the depression angle θ and has a width by the half angle of view α. That is, the camera 22 can image a range of (θ−α) to (θ+α) in the vertical direction with the horizontal direction as a reference.

A position where the optical axis A of the camera 22 intersects the ground is a position away from a position of the camera 22 on the ground downward in the vertical direction by a distance of h/tan θ in the X-axis direction. In addition, a closest position on the ground that can be imaged by the camera 22 is a position away from the position of the camera 22 on the ground downward in the vertical direction by a distance of h/tan(θ+α) in the X-axis direction. On the other hand, a farthest position on the ground that can be imaged by the camera 22 is a position away from the position of the camera 22 on the ground downward in the vertical direction by a distance of h/tan(θ−α) in the X-axis direction.

[Depression Angle Setting According to Farthest Imaging Distance of Camera]

In a case where the depression angle of the camera 22 is too small, the sky is reflected and thus the imaging efficiency deteriorates. On the other hand, in a case where the depression angle of the camera 22 is too large, only a building close to the camera 22 is reflected, which deteriorates imaging efficiency. For this reason, it is necessary to set an optimum depression angle of the camera 22.

The camera angle deciding system 30 calculates the depression angle based on a farthest imaging distance x [unit: meter] of the camera 22 in the horizontal direction. Specifically, the camera angle deciding system 30 calculates the depression angle such that a building away from the drone 20 by the farthest imaging distance x in the horizontal direction is imaged. The reason for setting the farthest imaging distance x is that a size of the building away from the farthest imaging distance x in the image is too small even in a case where the building fits within the image, and it is not possible to analyze a degree of damage due to a resolution of the camera 22.

The farthest imaging distance x of the camera 22 is a predetermined value based on the resolution of the camera 22. In performing determination of the damage to the building with the captured image by the camera 22, it is not possible to correctly determine the damage in a case where the image resolution of individual buildings is low. Thus, a required resolution is experimentally decided in advance. For example, information that the degree of damage cannot be determined without the resolution of 20 pixels or more per meter is acquired.

Regarding the camera 22, a size (vertical×horizontal) of the imaging element (not shown) [unit: millimeter], a focal length of the lens (not shown) [unit: millimeter], and an image size (vertical×horizontal) [unit: pixel] is known in advance. The camera angle deciding system 30 decides the farthest imaging distance x of the building reflected in the image from the information of the resolution.

The depression angle θ based on the farthest imaging distance x decided in this manner may be set to θ which satisfies the following Equation 1.

$$x \cdot \tan(\theta - \alpha) = h \qquad \text{(Equation 1)}$$

The camera angle deciding system 30 sets the depression angle of the camera 22 to θ which satisfies Equation 1 and causes the drone 20 to fly at the height h from the ground to be able to perform the imaging with the optimum depression angle.

[Depression Angle Setting According to Degree of Density of Buildings]

Figure 3:
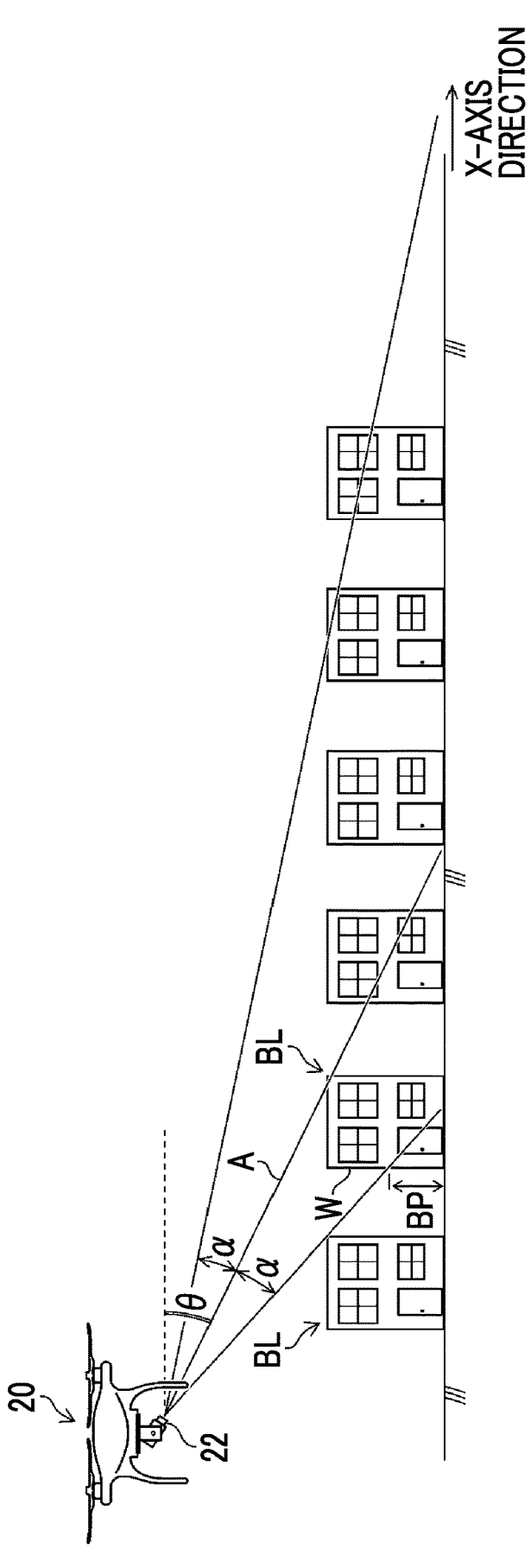
FIG. 3 is a diagram for describing a range in which a wall surface of a building is not reflected.

In a case where buildings are densely located in the imaging target area, even in a case where the building is within the farthest imaging distance x, the wall surface, which is important in a building structure, may not be sufficiently reflected. FIG. 3 is a diagram for describing a range in which a wall surface W of a building BL is not reflected. In FIG. 3, a range BP of the wall surface W of the building BL facing the traveling direction of the drone 20 is hidden by the building BL on a front side in the traveling direction of the drone 20, and thus the camera 22 cannot image the range BP thereof.

Therefore, the camera angle deciding system 30 calculates the depression angle based on the degree of density of the plurality of buildings in the imaging target area imaged by the camera 22 in one flight of the drone 20. The degree of density of the plurality of buildings includes an average d [unit: meter] of heights of the plurality of buildings and an average s [unit: meter] of spacings between the plurality of buildings.

Figure 4:
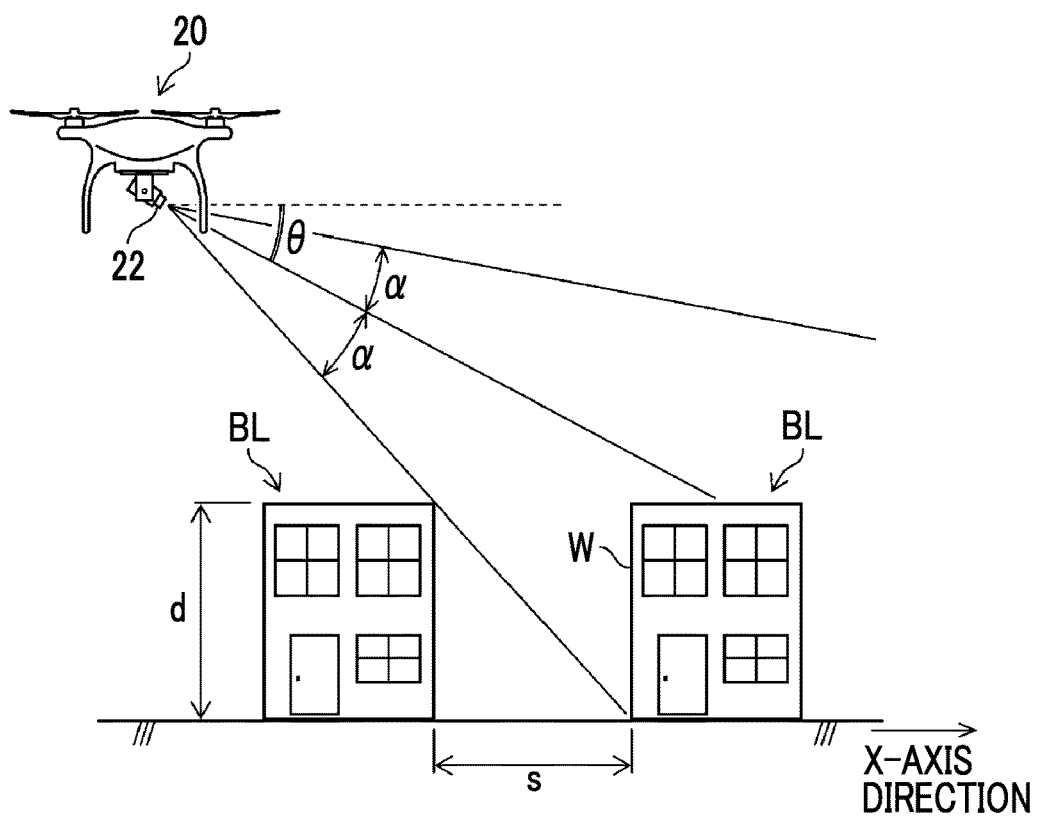
FIG. 4 is a diagram for describing a relationship between a degree of density of a plurality of buildings in an imaging target area and the imaging range of the camera.
Figure 5:
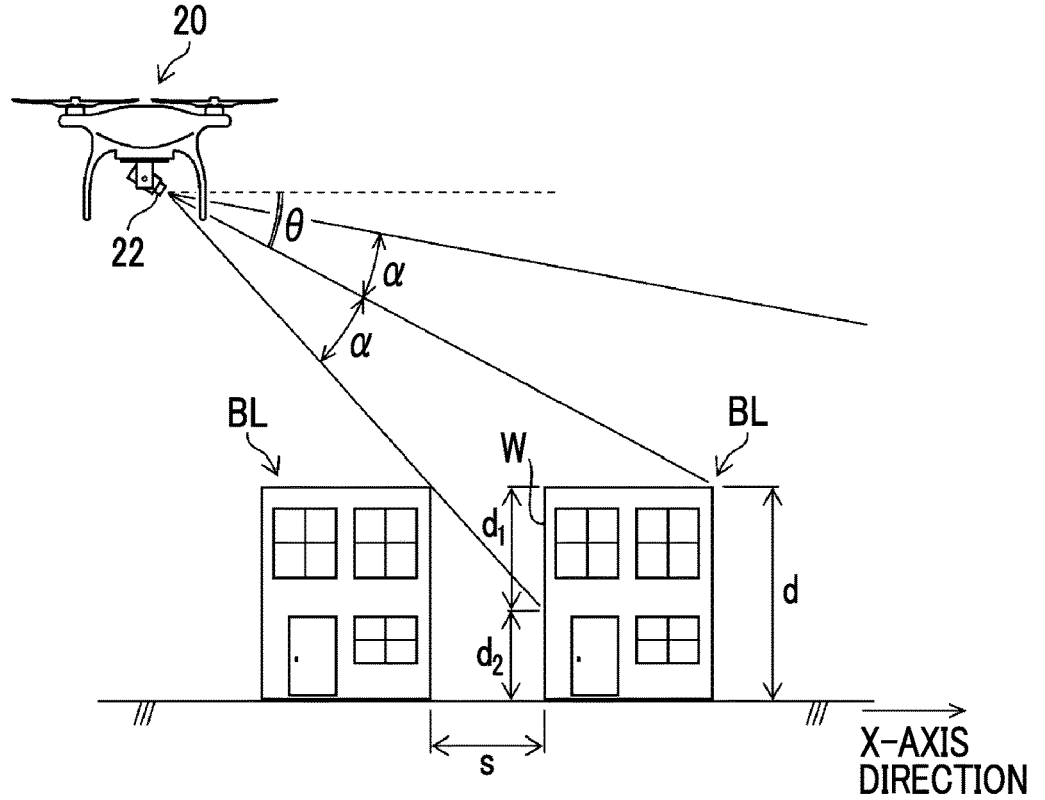
FIG. 5 is a diagram for describing the relationship between the degree of density of the plurality of buildings in the imaging target area and the imaging range of the camera.

FIGS. 4 and 5 are diagrams for describing a relationship between the degree of density of the plurality of buildings in the imaging target area and the imaging range of the camera 22. In the imaging target area of the average d of the heights of the buildings BL and the average s of the spacings between the buildings BL, FIG. 4 shows the depression angle $\theta$ that is necessary for the camera 22 to cause a lower end of the wall surface W of the building BL facing the traveling direction of the drone 20 to be reflected. The depression angle $\theta$ satisfies the following Expression 2.

$$s \cdot \tan(\theta+\alpha)=d \qquad \text{(Expression 2)}$$

In addition, in a case of a certain depression angle $\theta$, a degree to which the wall surface W of the building BL is reflected is considered. As shown in FIG. 5, a range of the wall surface W of the building BL imaged by the camera 22 is up to a position away from an upper end of the wall surface W by a distance $d_1$. The distance $d_1$ can be represented by the following Expression 3.

$$d_1=s \cdot \tan(\theta+\alpha) \text{(however, } d_1=d \text{ in a case where value}$$
$$\text{of } d_1 \text{ exceeds } d) \qquad \text{(Expression 3)}$$

In addition, as shown in FIG. 5, a range of the wall surface W which is not imaged by the camera 22 is up to a position away from the lower end (ground) of the wall surface W by a distance $d_2$. The distance $d_2$ can be represented by the following Expression 4.

$$d_2=d-d_1 \qquad \text{(Expression 4)}$$

Here, a range in the vertical direction imaged by the camera 22 is $h/\tan(\theta+\alpha)$ to $h/\tan(\theta-\alpha)$ on an angle of view of the camera 22 and is 0 to x on the resolution of the camera 22. Therefore, in a case where a distance of an imaging target point from the camera 22 in the horizontal direction is r [unit: meter], a first function $E_1(\theta)$ regarding how efficiently the building fits within the image in the horizontal direction is can be represented by r that satisfies the following Expression 5 and Expression 6. The imaging target point means a point where the camera 22 images. In addition, the distance r of the imaging target point from the camera 22 in the horizontal direction means a distance between a point of the camera 22 on the ground in the vertical direction and the imaging target point.

$$h/\tan(\theta+\alpha) \leq r \leq h/\tan(\theta-\alpha) \qquad \text{(Expression 5)}$$

$$0 \leq r \leq x \qquad \text{(Expression 6)}$$

On the other hand, a second function $E_2(\theta)$ regarding whether or not the wall surface W has been imaged as much as possible can be represented by the following Expression 7 from Expression 3.

$$E_2(\theta)=s \cdot \tan(\theta+\alpha) \text{(however, } E_2(\theta)=d \text{ in a case where}$$
$$\text{value of } E_2(\theta) \text{exceeds } d) \qquad \text{(Expression 7)}$$

The camera angle deciding system 30 obtains an imaging efficiency $e_1(\theta)$ in the horizontal direction and an imaging efficiency $e_2(\theta)$ of the wall surface, based on $E_1(\theta)$ and $E_2(\theta)$. For example, the camera angle deciding system 30 performs standardization as represented by the following Expression 8 and Expression 9.

$$e_1(\theta)=E_1(\theta)/\max E_1 \qquad \text{(Expression 8)}$$

$$e_2(\theta)=E_2(\theta)/\max E_2 \qquad \text{(Expression 9)}$$

Here, $\max E_1$ is a maximum value of $E_1(\theta)$, and $\max E_2$ is a maximum value of $E_2(\theta)$.

Further, the camera angle deciding system 30 obtains a final imaging efficiency $e(\theta)$ based on $E_1(\theta)$ and $E_2(\theta)$ to obtain an optimum depression angle $\theta$. For example, the final imaging efficiency $e(\theta)$ can be obtained by the following Equation 10 or Equation 11.

$$e(\theta)=e_1(\theta) \cdot e_2(\theta) \qquad \text{(Expression 10)}$$

$$e(\theta)=e_1(\theta)+e_2(\theta) \qquad \text{(Expression 11)}$$

The depression angle $\theta$ in which $e(\theta)$ obtained in this manner is maximized may be set as the optimum depression angle $\theta$.

Alternatively, in a case where priority is provided to any one of the imaging efficiency $e_1(\theta)$ in the horizontal direction or the imaging efficiency $e_2(\theta)$ of the wall surface, weighting may be performed to calculate $e(\theta)$. For example, in a case where the imaging efficiency $e_2(\theta)$ of the wall surface is prioritized, weighting coefficients may be prepared such as $w_1=0.5$ and $w_2=1.0$ to calculate $e(\theta)$ by using the following Equation 12.

$$e(\theta)=w_1 \cdot e_1(\theta)+w_2 \cdot e_2(\theta) \qquad \text{(Expression 12)}$$

Figure 6:
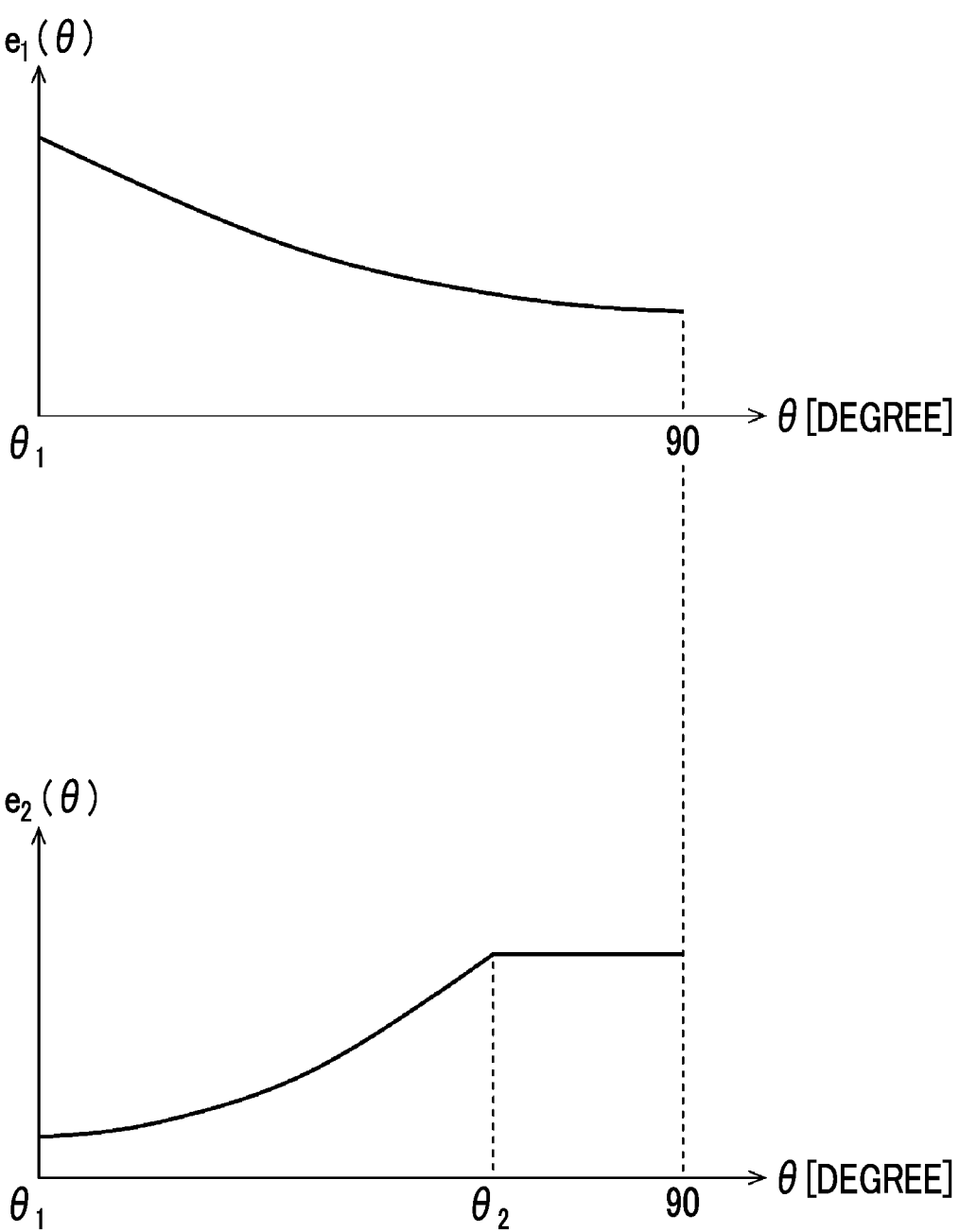
FIG. 6 is a diagram showing an example of an imaging efficiency in a horizontal direction and an imaging efficiency of the wall surface.

FIG. 6 is a diagram showing an example of the imaging efficiency $e_1(\theta)$ in the horizontal direction and the imaging efficiency $e_2(\theta)$ of the wall surface. $\theta_1$ shown in FIG. 6 is the depression angle based on the farthest imaging distance x and satisfies Equation 1. Therefore, the depression angle $\theta$ is an angle in a range of $\theta_1$ or more and 90 degrees or less.

As shown in FIG. 6, a value of the imaging efficiency $e_1(\theta)$ in the horizontal direction becomes relatively smaller (that is, the efficiency relatively deteriorates) as the depression angle $\theta$ becomes relatively larger. On the other hand, a value of the imaging efficiency $e_2(\theta)$ of the wall surface becomes relatively larger (that is, the efficiency is relatively good) as the depression angle $\theta$ becomes relatively larger, and is constant in a case where the depression angle $\theta$ is equal to or larger than $\theta_2$. The $\theta_2$ is a depression angle at which the lower end (position in contact with the ground) of the wall surface W can be reflected.

In an area, such as a depopulated area, in which buildings are not adjacent to each other, $\theta+\alpha$ is 0 or a value close to 0, and thus $\theta_2 < 0$. Therefore, the wall surface of the building is always reflected by the camera 22, and $\theta_1$ is the optimum value of the depression angle $\theta$.

[Depression Angle Setting According to Imaging Target Area]

During the flight of the drone 20, in a case where an imaging target area changes, such as from a city area to an area having a farm, the average of the heights of the buildings and the average of the spacings between the buildings are changed. Accordingly, the depression angle set before the flight of the drone 20 may not be the optimum angle.

Therefore, the camera angle deciding system 30 may set the depression angle according to the imaging target area. For this purpose, the camera angle deciding system 30 holds, in a list (an example of the depression angle information stored in advance for each area) in advance, the depression angles calculated from information regarding the average of the heights and the average of the spacings of the buildings of each area obtained by dividing an area. The camera angle deciding system 30 changes the camera angle before the imaging target area changes, based on a current position of the drone 20 acquired from the GPS detector (not shown) of the drone 20, a height of the drone 20 from the ground acquired from the altitude meter (not shown) of the drone 20, and a speed of the drone 20 acquired from the speed sensor (not shown) of the drone 20. That is, the camera angle deciding system 30 acquires information on the area imaged by the camera 22 and acquires the depression angle of the area acquired from the depression angle information stored in advance for each area to set the camera 22 at the acquired depression angle. The information on the area means, for example, information indicating a municipality.

Figure 7:
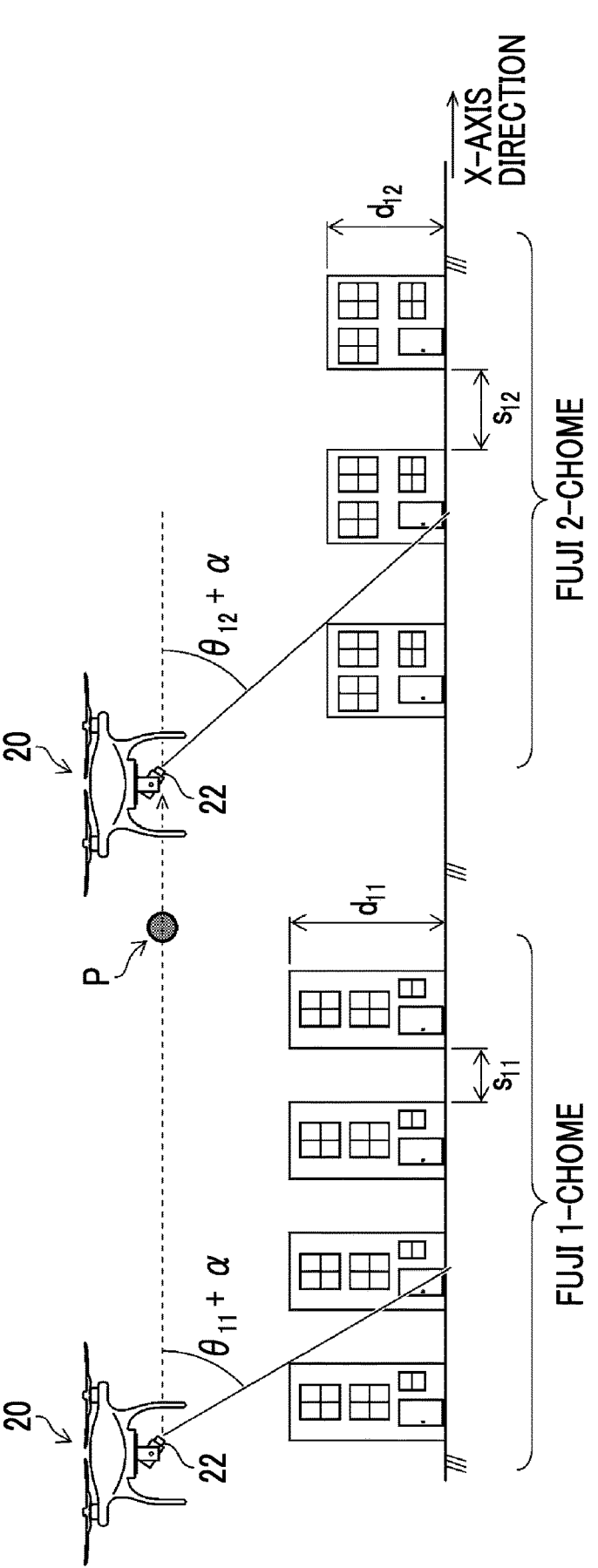
FIG. 7 is a diagram for describing the setting of the depression angle according to the imaging target area.

FIG. 7 is a diagram for describing the setting of the depression angle according to the imaging target area. As shown in FIG. 7, in Fuji 1-chome, which is an example of the imaging target area, the average of the heights of the plurality of buildings is $d_{11}$, and the average of the spacings between the plurality of buildings is $s_{11}$. In addition, the optimum depression angle for imaging Fuji 1-chome is $\theta_{11}$.

On the other hand, Fuji 2-chome, which is an example of another imaging target area, is adjacent to Fuji 1-chome in the traveling direction of the drone 20, and the average of the heights of the plurality of buildings is $d_{12}$, and the average of the spacings between the plurality of buildings is $s_{12}$. In addition, the optimum depression angle for imaging Fuji 2-chome is $\theta_{12}$.

In the example shown in FIG. 7, the camera angle deciding system 30 changes the depression angle $\theta_{11}$ to the depression angle $\theta_{12}$ at a point P that is a boundary of the imaging target area, based on the current position and speed of the drone 20.

Instead of changing the camera angle based on the position information of the drone 20, in a case where the captured image of the camera 22 is analyzed in real time to calculate the average of the heights of the buildings and the average of the spacings between the buildings, and the calculated average of the heights thereof and average of the spacings therebetween deviates from the average of heights of the buildings and the average of the spacings between the buildings, which are used for calculating the depression angle set before the imaging, an appropriate depression angle may be calculated again to change the camera angle.

[Damage Determination Method]

Figure 8:
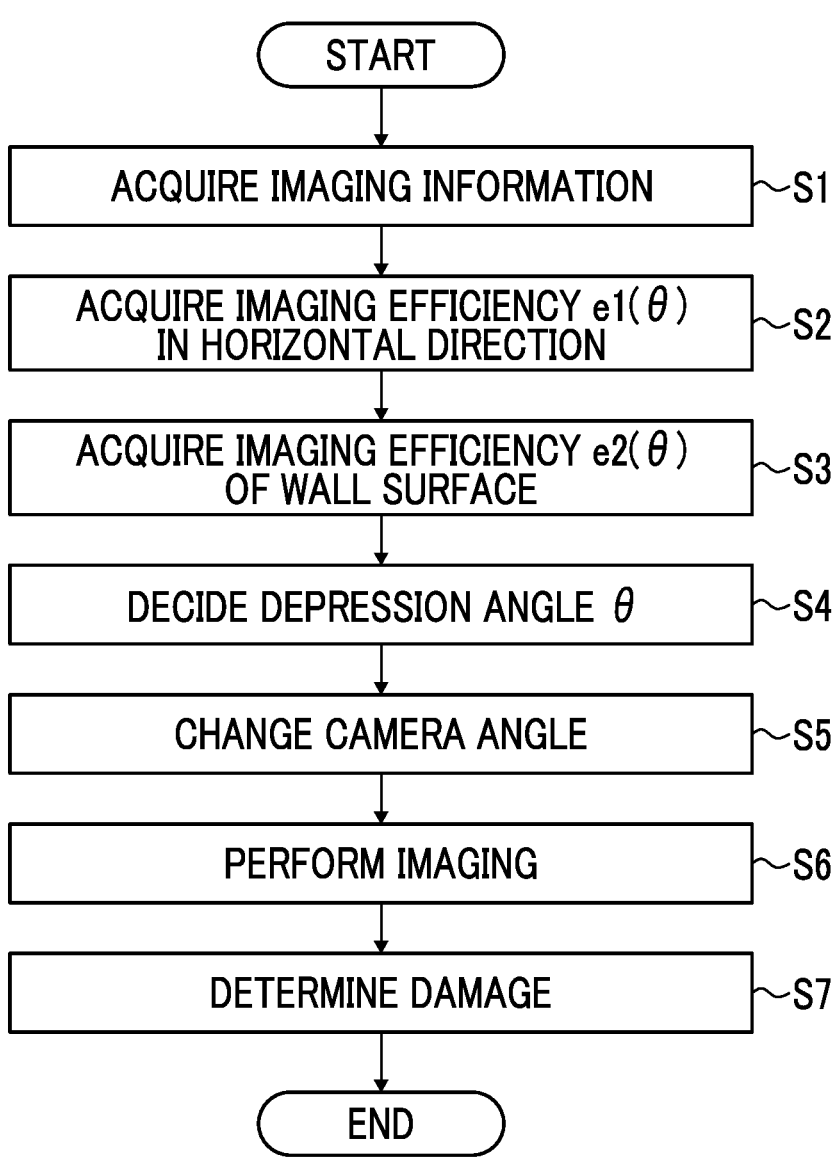
FIG. 8 is a flowchart showing a damage determination method by the damage determination system.

FIG. 8 is a flowchart showing a damage determination method including a camera angle deciding method by the damage determination system 10. In FIG. 8, step S1 to step S4 correspond to the camera angle deciding method. The camera angle deciding method is realized by the processor 32A reading out a camera angle deciding program from the memory 32B and executing the camera angle deciding program. The camera angle deciding program may be stored in the storage 38A, may be provided by being stored in a computer-readable non-transitory storage medium, or may be provided by being downloaded via the network NT.

In step S1, the processor 32A acquires imaging information. The imaging information includes the height h of the camera 22 from the ground, the half angle of view a of the camera 22, the farthest imaging distance x of the camera 22 in the horizontal direction, and the degree of density of the plurality of buildings in the imaging target area.

In the present embodiment, a value of the flight altitude of the drone 20 is used for the height h of the camera 22 from the ground. The user can set any value for the flight altitude of the drone 20 within a range determined by an aviation method. In the present embodiment, the flight altitude is 149 meters.

The degree of density of the plurality of buildings in the imaging target area includes the average d of the heights of the plurality of buildings in the imaging target area and the average s of the spacings between the plurality of buildings. The processor 32A obtains the average s of the spacings between the buildings in the imaging target area using a geospatial information map provided by the Geospatial Information Authority of Japan in the management server 50 or data on the Internet. In addition, the processor 32A calculates the average d of the heights of the buildings in the imaging target area by using information of a three dimensions (3D) model.

In Step S2, the processor 32A obtains the imaging efficiency $e_1(\theta)$ in the horizontal direction based on the first function $E_1(\theta)$.

In Step S3, the processor 32A obtains the imaging efficiency $e_2(\theta)$ of the wall surface based on the second function $E_2(\theta)$.

In Step S4, the processor 32A obtains the optimal depression angle $\theta$ of the camera 22 based on the imaging efficiency $e_1(\theta)$ in the horizontal direction and the imaging efficiency $e_2(\theta)$ of the wall surface.

In Step S5, the processor 32A transmits the optimum depression angle $\theta$ obtained in Step S4 to the drone 20 via the network NT. The drone 20 controls a motor (not shown) of the gimbal 24 to change the camera angle of the camera 22 to the depression angle $\theta$ acquired from the processor 32A.

In step S6, the processor 32A causes the drone 20 to fly and causes the camera 22 to image the plurality of buildings on the ground. The drone 20 takes off in accordance with a designation of the processor 32A and images the plurality of buildings on the ground with the camera 22.

In step S7, the management server 50 acquires the image captured by the camera 22 via the network NT and determines the damage to the plurality of buildings in the image by the trained model. A determination result of the damage by the trained model is transmitted to the camera angle deciding system 30 via the network NT. The processor 32A causes the display unit 34A (an example of output device that outputs determination result) of the display device 34 to display the acquired determination result of the damage.

With the camera angle deciding method, it is possible to decide an appropriate imaging angle of the camera 22 for imaging the wall surfaces of the densely located buildings. Therefore, with the damage determination method, in a case where the collapse of house due to an earthquake, the flooding of house due to a flood, and the like occur over a wide range, it is possible to efficiently check the wall surface of the house required for the collapse determination and the like with the control of the angle of the camera mounted on the drone 20.

Here, although the height h of the camera 22 from the ground, the half angle of view $\alpha$ of the camera 22, the farthest imaging distance x of the camera 22 in the horizontal direction, and the degree of density of the plurality of buildings in the imaging target area are acquired as the imaging information to decide the depression angle θ, the depression angle θ according to the imaging target area may be acquired as the imaging information to change the camera angle to the acquired depression angle θ.

Others

In the present embodiment, the camera angle of the camera 22 mounted on the drone 20 has been described, but the camera 22 is not limited to the camera mounted on the flying object such as the drone 20 and may be any camera that images the building on the ground from a high place. In addition, the camera 22 only needs to be able to image the plurality of buildings on the ground and does not need to be in the sky above the ground. For example, a case is also possible in which the plurality of buildings on the ground are imaged from the sky above a sea or a lake. In this case, the "height h of the camera 22 from the ground" corresponds to "height h of the camera 22 from the sea" or "height h of the camera 22 from the lake".

In addition, in the present embodiment, the depression angle is set using the information of the average of the heights of the buildings and the average of the spacings between the buildings. However, the values used for the height of the building and the spacing between the buildings are not limited to the average values. For example, the height of the building and the spacing between the buildings may be a median value, a maximum value, or a minimum value. In addition, in the present embodiment, although the units of the height h, the depression angle θ, the half angle of view α, the farthest imaging distance x, the size of the imaging element, the focal length of the lens, the image size, the average d of the heights of the plurality of buildings, the average s of the spacings between the plurality of buildings, and the distance r have been described, these units are merely examples, and other units may be used.

The technical scope of the present invention is not limited to the range described in the above-described embodiments. The configurations and the like in each embodiment can be appropriately combined between the respective embodiments without departing from the gist of the present invention.

EXPLANATION OF REFERENCES

10: damage determination system
20: drone
22: camera
24: gimbal
30: camera angle deciding system
32: terminal for monitoring
32A: processor
32B: memory
34: display device
34A: display unit
36: input device
36A: operation unit
38: storage device
38A: storage
40: communication device
40A: communication interface unit
50: management server
A: optical axis BL: building
NT: network
P: point
S1 to S7: step of damage determination method
W: wall surface

What is claimed is:

1. A camera angle deciding device that decides a depression angle formed between a horizontal direction and an optical axis of a camera which images a plurality of buildings on a ground from a sky and converts the imaged buildings into image data, the camera angle deciding device comprising:

at least one processor; and at least one memory that stores a command for execution by the at least one processor, wherein the at least one processor is configured to:

calculate a degree of density of the plurality of buildings based on heights of the plurality of buildings and spacings between the plurality of buildings; and decide the depression angle based on a height of the camera from the ground and the degree of density of the plurality of buildings.

2. The camera angle deciding device according to claim 1, wherein in a case where a height of the camera from the ground is h, the depression angle is θ, a half angle of view of the camera is a, a distance of an imaging target point from the camera in the horizontal direction is r, a farthest imaging distance of the camera based on a resolution of the camera is x, an average of the heights of the plurality of buildings is d, and an average of the spacings between the plurality of buildings is s, the at least one processor is configured to:

calculate an imaging efficiency $e_1(\theta)$ in the horizontal direction based on a first function $E_1(\theta)$ represented by r that satisfies $$h/\tan(\theta+\alpha) \leq r \leq h/\tan(\theta-\alpha)$$

and $0 \leq r \leq x$; and calculate an imaging efficiency $e_2(\theta)$ of wall surfaces of the plurality of buildings based on a second function $E_2(\theta)$ represented by $$E_2(\theta) = s \cdot \tan(\theta+\alpha)$$

to decide the depression angle θ based on the imaging efficiency $e_1(\theta)$ in the horizontal direction and the imaging efficiency $e_2(\theta)$ of the wall surface with $E_2(\theta)$ =d in a case where a value of $E_2(\theta)$ exceeds d.

3. The camera angle deciding device according to claim 2, wherein the at least one processor is configured to:

standardize the first function $E_1(\theta)$ to calculate the imaging efficiency $e_1(\theta)$ in the horizontal direction; and standardize the second function $E_2(\theta)$ to calculate the imaging efficiency $e_2(\theta)$ of the wall surface.

4. The camera angle deciding device according to claim 2, wherein the at least one processor is configured to:

weight the imaging efficiency $e_1(\theta)$ in the horizontal direction and the imaging efficiency $e_2(\theta)$ of the wall surface to decide the depression angle θ.

5. An imaging system comprising:

a flying object;

the camera mounted on the flying object;

a support device that supports the camera such that the depression angle of the camera is configured to be changed; and the camera angle deciding device according to claim 1.

6. The imaging system according to claim 5,
wherein the at least one processor is configured to:
acquire information on an area imaged by the camera; and
acquire the depression angle of the acquired area from
depression angle information stored in advance for
each area, and
the support device sets the camera at the acquired depression angle.

7. A damage determination system comprising:
a trained model that determines damage to the plurality of buildings based on an image captured by the imaging
system according to claim 6; and
an output device that outputs a result of the determination.

8. A camera angle deciding method of deciding a depression angle formed between a horizontal direction and an optical axis of a camera which images a plurality of buildings on a ground from a sky and converts the imaged
buildings into image data, the camera angle deciding method
comprising:
calculating a degree of density of the plurality of buildings based on heights of the plurality of buildings and
spacings between the plurality of buildings; and
deciding the depression angle based on a height of the
camera from the ground and the degree of density of the
plurality of buildings.

9. A non-transitory, computer-readable tangible recording
medium which records thereon a program for causing, when
read by a computer, the computer to execute the camera
angle deciding method according to claim 8.

<div align="center">* * * * *</div>

30